United States Patent [19]

Roos et al.

[11] Patent Number: 4,559,624
[45] Date of Patent: Dec. 17, 1985

[54] DIGITAL CONCENTRATOR

[75] Inventors: Sture G. Roos, Linjevägen; Nils U. H. Fagerstedt, Rondellen; Jens E. Pehrson, Solängsvägen, all of Sweden

[73] Assignee: Telefonaktiebolaget LM Ericsson, Stockholm, Sweden

[21] Appl. No.: 574,106

[22] PCT Filed: May 17, 1983

[86] PCT No.: PCT/SE83/00194
§ 371 Date: Dec. 29, 1983
§ 102(e) Date: Dec. 29, 1983

[87] PCT Pub. No.: WO83/04363
PCT Pub. Date: Dec. 8, 1983

[30] Foreign Application Priority Data

May 26, 1082 [SE] Sweden ............................ 8203278

[51] Int. Cl.$^4$ ...................... H04Q 11/00; H04Q 11/04
[52] U.S. Cl. .......................................... 370/56; 370/58; 370/67
[58] Field of Search ........................ 370/56, 58, 67, 66

[56] References Cited

U.S. PATENT DOCUMENTS 3,787,631 1/1974 Lewis ...................................... 370/67
4,354,264 10/1982 Wurst ...................................... 370/56
4,366,566 12/1982 Cochennec ........................... 370/67

Primary Examiner—Douglas W. Olms
Assistant Examiner—Wellington Chin
Attorney, Agent, or Firm—Roberts, Spiecens & Cohen

[57] ABSTRACT

A digital concentrator includes line circuit modules (3,4) and provides time-division multiplex (TMD) channel set-ups between a bus (5), connected to all modules, and PCM links (1), each going from its own module, the number of links being less than the number of modules, as well as between groups of subscriber lines (2), connected to the modules, and the bus (5), and between the subscriber line group and the link being connected to the same module (4). The bus must always be used for a set-up to an arbitrary link from a subscriber line, the line circuit module (3) of which is solely connected to the bus (5). In order to avoid congestion on the bus as far as possible the bus is only used for a set-up to an arbitrary link from a subscriber line, the module (4) of which is connected to the bus (5) and to one of the links (1), solely if a given number of the TDM channels of the link associated with this module are already busy.

5 Claims, 1 Drawing Figure

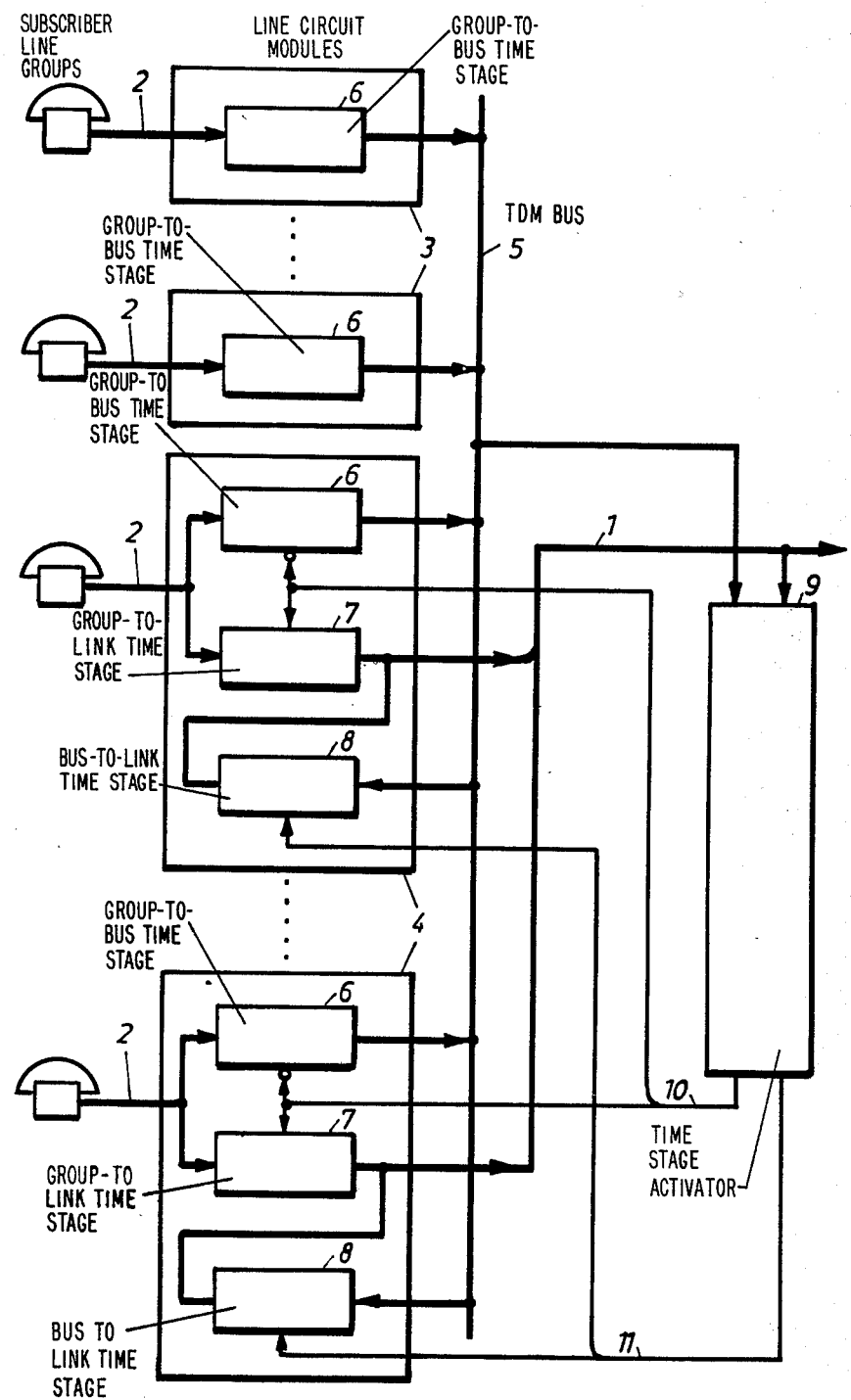

DIGITAL CONCENTRATOR

TECHNICAL FIELD

The present invention relates to a digital concentrator for time-division-multiplex (TDM) channel set-ups from incoming subscriber lines to outgoing PCM links, the concentrator including line circuit modules, each one connected to a group of subscriber lines, the total number of channels in the links being less than the total number of subscriber lines and the number of links being less than the number of line circuit modules.

BACKGROUND ART

For channel set-ups from a single group of subscriber lines, constituting a single incoming TDM line, to a single outgoing PCM link, a single time stage for switching in time is sufficient for providing a set-up between an arbitrary subscriber line and an arbitrary link channel. However, a large digital concentrator including a plurality of subscriber line groups and a plurality of PCM links going to a central transit exchange needs, in principle, both a time stage for switching in time and a space stage for switching from an arbitrary incoming TDM line to an arbitrary outgoing PCM link.

It is known, e.g. from the U.S. Pat. No. 4,167,652 that the space stage can be avoided if a TDM bus system is provided, to the input modules of which are connected all TDM lines for transferring of information coming from the subscribers. PCM links for transferring information intended for the central exchange, as well as outgoing TDM lines for transferring internal information from one to the other of the subscribers without loading the PCM links, may be connected to the output modules of the bus system.

A so-called time-time system is obtained, which carries out a first time switch from an incoming subscriber channel to a bus channel and a second time switch from this bus channel, either to an outgoing link channel or to an outgoing subscriber channel. The time-time system is congestion-free if the number of bus channels is just as great as the total number of subscriber lines, the concentrator effect then occurring between the bus and the outgoing PCM links. Known TDM buses in large time-time systems are very high-speed and include very complicated input and output modules. Designs with two-way traffic on the bus and loop bus designs for one-way traffic are also known.

DISCLOSURE OF THE INVENTION

One object of the present invention is to provide a digital concentrator for a plurality of subscriber line groups and a plurality of PCM links without a space stage, and a TDM bus which is low-speed and uncomplicated as far as possible, by not dimensioning the bus so that it is free from congestion. If a bus, which has been connected in accordance with the above to the subscriber line groups and to the PCM links, has a number of TDM channels lying between the total number of PCM link channels and the total number of subscriber lines, there is obtained a two-stage concentration from the incoming subscriber lines to the outgoing PCM links and a one-stage concentration from the incoming to the outgoing subscriber lines. If there is congestion on the bus due to intensive internal traffic between the subscribers, congestion is also obtained to the central exchange even if there are idle channels on the PCM links. If the number of channels on the bus is less than the total number of channels on the links, the concentration is entirely disposed between the subscriber lines and the bus, and the risk for bus congestion will then be particularly large.

A further object of the invention is the avoidance as far as possible of congestion to the central exchange due to congestion on the simplified bus, this being effected by connecting the subscriber line groups in a novel manner to the bus and to the PCM links. Apart from the time stage for time-time switching from the subscriber lines via the bus to the link channels, time stages are also arranged for switching from a subscriber line group directly to an assigned PCM link. The inventive concentrator is controlled so that time-time switching is carried out only if a direct set-up from subscriber to PCM link is impossible because the subscriber in question is not included in a subscriber line group with an assigned PCM link, or because the assigned link is already heavily loaded. The invention is characterized as will be seen from the claims.

DESCRIPTION OF FIGURES

The invention will now be described with reference to the appended drawing whose sole FIGURE is a block diagram showing PCM links 1 and subscriber line groups 2 for information going from subscribers to a central transit exchange. The drawing also illustrates a TDM bus 5, group-to-bus time stages 6, group-to link time stages 7, bus-to-link time stages 8 and a time stage activating means 9.

PREFERRED EMBODIMENT

The drawing illustrates the parts of the concentrator used in accordance with the invention for providing TDM channel establishments from subscriber lines to a plurality of PCM links 1, but does not illustrate such equipment as is used for establishing paths from subscriber to subscriber. With the use of TDM technique the subscriber lines are divided up into subscriber line groups 2, each group being connected to a line circuit module 3, 4. The PCM links are each assigned to a line circuit module. Since the number of links is less than the number of line circuit modules, there are modules without link connection 3 and modules with link connection 4. The drawing illustrates a TDM bus 5, the inputs of which are each connected to a module 3, 4 and the outputs of which are each connected to those modules 4 with link connection 4.

The line circuit modules 3, 4 each include a group-to-bus time stage 6, the input of which is connected to the associated subscriber line group and the output of which is connected to the bus. The modules 4 with link connection each further include a group-to-link time stage 7 with its input connected to the associated subscriber line group and its output connected to the assigned PCM link, as well as a bus-to-link time stage 8 with its input connected to the bus and its output connected to the assigned PCM link. The time stages 6, 7, 8 are of conventional construction and provide time switching between arbitrary channels of respective input side and output side TDM systems.

The drawing thus does not illustrate in detail the time stage control for carrying out a given line set-up.

Two alternatives are obtained for setting up subscriber lines, connected to a module 4 with link connection to the links 1. In accordance with the first alternative, the group-to-link time stage 7 arranged in this module is activated, a channel of the link connected to this module being used. In accordance with the second alternative, the group-to-bus time stage 6 arranged in this module is activated together with one of the bus-to-link time stages 8, arranged in another module, a channel of one of the links, connected to the other module, being used.

For setting up the subscriber lines connected to a module without link connection 3 to the links 1, the group-to-bus time stage 6 associated with this module together with one of the bus-to-link time stages 8 of the concentrator are activated (similar to the second alternative).

The concentrator includes a time stage activation means 9, the inputs of which (according to the drawing) are connected to the PCM links 1 and to the TDM bus 5 for conventionally registering which bus channels and link channels are idle and which are busy. Requisite for the above-mentioned time stage activation for setting-up from a subscriber line to a link channel is obviously that there are idle bus and link channels available, otherwise the subscriber in question will be blocked. For the aforesaid time-time set-ups by means of group-to-bus time stages and bus-to-link time stages the activation means uses an engagement sequence rule which does not concern the present invention. It is however included in the scope of the invention that the activation means selects one of the two aforementioned set-up alternatives according to the following rule: The group-to-bus time stage 6 of a module with link connection 4 is activated according to the aforesaid second alternative solely if a definite number of channels of the link associated with this module are already busy. Activation of the group-to-link time stage 7 arranged in this module otherwise takes place according to the aforementioned first alternative.

The outputs of the activation means 9 are connected via signal lines 10, 11 associated with the respective module, to time stages included in the modules 4 with link connection. The group-to-link time stage of the respective module and the associated group-to-bus time stage provided with an inverting activation input are controlled, as will be seen from the drawing, with the aid of an activation signal transmitted on one of the signal lines 10. There is thus indicated that these two time stages are never activated simultaneously. The bus-to-link time stage of the respective module is controlled with the aid of an activation signal transmitted on one of the signal lines 11. So as not to load the bus unneccesarily, the activation means only in exceptional cases sends signals which simultaneously activate the group-to-bus time stage and the bus-to-link time stage in the same module.

The aforementioned given number of already busy link channels, one of the set-up alternatives being selected in dependence of this number, is decided with regard to the speech and synchronisation channels of the links and for providing desired distribution of the traffic on the PCM links. For example, if one of the subscriber line groups with associated link has a call frequency to the central exchange which is much greater than the call frequency of other groups, some speech channels are reserved on this link for the remaining groups at the cost of greater risk of congestion on the bus. Otherwise, the risk of bus congestion will be least if the first alternative is used, as long as a speech channel on the respective PCM link is idle, the group-to-bus time stage and bus-to-link time stage in the same module never needing to be activated simultaneously. If the second alternative is used in spite of the respective link having several idle speech channels, the time stage activation means can be formed such that it cancels the reservation of some speech channels if there is congestion on the bus, or if all the speech channels of the remaining links are busy. Furthermore if bus congestion is not a hindrance, a subscriber line connected to a module with link connection may exceptionally be set-up, even so, to a reserved speech channel on the link of the associated module in such way that the activation means activates for setting-up both the group-to-bus time stage and the bus-to-link time stage associated with this module.

What is claimed is:

1. In a time-division-multiplex (TDM) communication having a plurality of subscriber lines arranged in a number of subscriber line groups and a plurality of outgoing PCM links, a digital concentrator for TDM channel set-ups from the incoming subscriber lines to the outgoing PCM links comprising:

a TDM bus having a plurality of channels at least equal to the number of subscriber lines in a group but less than the total number of subscriber lines; a plurality of first line circuit modules for connecting some of the subscriber groups to said TDM bus each of said first line circuit modules including a group-to-bus time stage means for setting up a communication between a arbitrary subscriber line of the associated group and an arbitrary channel of said TDM bus, the number of said first line circuit modules on being less than the total number of subscriber line groups whereby only some of said subscriber line groups are directly connected to said TDM bus; a plurality of second line circuit modules for connecting the remaining subscriber line groups to PCM links, each of said second line circuit modules including a group-to-bus time stage means for setting up communication between and arbitrary subscriber line of the associated group of subscriber lines and an arbitrary channel of said TDM bus, a group-to-link time stage for setting up communication between an arbitrary subscriber line of said associated group of subscriber lines and an arbitrary channel of the associated PCM link and a bus-to-link time stage for setting up communication between an arbitrary channel of said TDM bus and an arbitrary channel of said associated PCM link; and time stage activation means including means for activating the group-to-bus time stage of a second line circuit module only if a given number of channels of the associated PCM link is busy or otherwise activating the group-to-link time stage of the same second line circuit module.

2. Digital concentrator according to claim 1, characterized in that said given number of link channels includes all the speech channels of the link and excludes the signal and synchronizing channels of the link, and in that said activation means never simultaneously activates the group-to-bus time stage and the bus-to-link time stage in the same second line circuit module.

3. Digital concentrator according to claim 1, characterized in that said given number of link channels excludes the signal and synchronising channels of the link and at least one of the speech channels of the link as long as there are idle speech channels on the other links.

4. Digital concentrator according to claim 3, characterized in that the time stage activation means annuls said exclusion of at least one speech channel if there is a risk of bus congestion.

5. Digital concentrator according to claim 3, characterized in that the time stage activation means for setting-up to said excluded speech channel on a link simultaneously activates the group-to-bus time stage and the bus-to-link time stage in the module associated with this link.

* * * * *